Patented Jan. 1, 1952

2,580,809

UNITED STATES PATENT OFFICE

2,580,809

PROCEDURE FOR PURIFYING AQUEOUS LIQUID

Henry C. Marks, Glen Ridge, and Frede Bernhardt Strandskov, Clifton, N. J., assignors to Wallace & Tiernan Products, Inc., Belleville, N. J., a corporation of New Jersey No Drawing. Application June 14, 1949, Serial No. 99,133

13 Claims. (Cl. 210—23)

Procedures for purifying aqueous liquids have heretofore most commonly employed one or another of the halogens, e. g. chlorine, bromine or iodine, which may be introduced in relatively small quantities, of the order of a few parts per million by weight (P. P. M.) to achieve a disinfecting action. For the primary purpose of destroying bacteria or other living organisms in water supply systems, chlorine has had the widest use; it is not only prompt in reaction (i. e. when in free or so-called hypochlorous form) but is relatively stable in solution in the sense that a residual concentration may remain for a long time after a given treatment, to afford a continuing sterilizing effect in the aqueous liquid.

There are a number of situations, however, where chlorine has been found less than wholly satisfactory. For example, as pointed out in our U. S. Patent No. 2,443,429, granted June 15, 1948, for Procedure for Disinfecting Aqueous Liquid, special problems are encountered in the treatment of swimming pools and the like. The presence of ammonia (such term including various ammonia-type materials or compounds) introduced in the water by users of a pool, tends to convert free chlorine to chloramines, which are much slower in sterilizing action and indeed usually too slow to protect one swimmer from infection with organisms introduced by another near him. Excessive chlorination with the view of establishing, despite the ammonia, a residual of free, active chlorine (e. g. in hypochlorous form as distinguished from the chloramine form of available chlorine) is apt to result in the well known breakpoint reaction, yielding nitrogen trichloride which is irritating to the eyes and has a bad odor.

For these or other reasons it has been found very difficult, especially in a swimming pool that is actively used, to maintain a residual of free chlorine sufficient for prompt sterilizing effect. It may be explained that common procedure for chlorine or like treatment of swimming pool water is to withdraw successive quantities, e. g. as a continuous, relatively small stream, which are subjected to the treatment and then returned to the pool, the rate of operation being usually such that several hours are required for complete turn-over, for instance a period of 6 to 10 hours or so before the total quantity of recirculated water has equalled the total volume of the pool. While such incremental treatment can gradually correct a lowering of the residual content of active agent in the pool, or can compensate the gradual utilization of the agent throughout the pool, it cannot produce any drastic change in the entire body of water (i. e. to create a residual when none exists) in less than several hours. Thus if prompt sterilizing effect is required throughout the pool at all times, it must be achieved by an agent which is itself prompt in action yet stable against non-useful reactions or the like.

As an alternative to chlorine, both bromine and iodine have been proposed, it being found that the suitably rapid sterilization rates of these elements are much less affected by the presence of ammonia. In fact, the activity of iodine does not seem to be reduced by ammonia at all. Both of these substances, however, are quite expensive to use; they cost more per pound than chlorine and a greater weight is required, since the sterilization efficiency varies in accordance with atomic weight. For instance, the continuous introduction of iodine would be prohibitively expensive for most swimming pool operations, and the like use of bromine at least undesirably expensive. Furthermore, the highly corrosive nature of bromine makes it somewhat dangerous to handle, while iodine, a sticky, insoluble solid, is also difficult to use. In our above cited patent, however, we have disclosed and claimed certain effective procedure for disinfecting aqueous liquids, i. e. swimming pools and the like, wherein the advantages of bromine or iodine are realized, but with considerable avoidance of objectionable features such as just explained. The process of the patent, for example, involves maintaining in the water an established residual of bromine or iodine, by treating the recirculated stream with chlorine, which re-converts to available form, the bromide or iodide produced by the reaction of these halogens in removing organic contamination. Moreover the original concentration of such halogen can be established or replenished by simply adding bromide or iodide and treating the water with chlorine, thus avoiding any necessity of using elemental bromine or iodine.

With the exception of special and novel treatments, as just mentioned, it will be now seen that use of known sterilizing or purifying agents has been fraught with difficulty or inconvenience in the treatment of large bodies of water such as swimming pools, which are circumstanced to receive successive organic contaminations over a prolonged period of time. The requirements and conditions of this type of treatment, moreover, are large sui generis, as contrasted with circumstances of ordinary chemical reactions. The desired purifying action must be obtained with extremely minute concentrations of active agent, to avoid not only tastes, odors and the like, but also other undesirable effects, physiological or otherwise, occasioned by the active agent or by side—or end—products of the treatment. In consequence, very minute concentrations of reagents are usually preferred, e. g. extreme dilutions wherein the nature and extent of chemical reactions may be governed by considerations quite different from ordinary chemical work.

For instance, in swimming pools the normally required quantity of an active agent such as bromine or iodine is measured in parts per million (P. P. M.). In most cases, a maximum of 2 P. P. M. of the selected halogen, i. e. when present as an active residual, is fully adequate; it is usually preferable to keep the concentration somewhat below such value in swimming pool water. Although for some types of water treatment, procedures such as hereinbelow described may be usefully performed with higher concentrations (than a few P. P. M.) of the produced or maintained halogen residual, for instance even up to 100 P. P. M. if the circumstances permit such relatively high concentration of halogen (indeed, under appropriate conditions, as for industrial water systems, active halogen treatments may have utility even at relatively very high values of halogen content), concentrations of as much as the upper value named, still represent a rather extreme order of dilution.

It has now been found that very desirable results, especially in sterilization and for convenience to users of a swimming pool or the like, as well as in economy, safety and convenience for the operators or other persons having to do with a swimming pool, may be obtained by a new procedure, i. e. in accordance with the present invention. More particularly, it has been found that by introducing into the water a suitable concentration of a halide of greater atomic weight than chlorine, viz. a bromide or iodide, and then treating the water with ozone, an effective purifying operation can be achieved, including the production of a residual content of sterilizing agent. Another and more specific aspect of the procedure, for instance in operations where successive portions of the body of water are continually re-circulated through an external region (as in a swimming pool), involves simply the original establishment of a desired content of halogen of the stated type in the water, while treating the re-circulated stream more or less continuously with ozone to maintain the halogen content, as will be explained below. No continuous feed of halogen is required; indeed when followed by the ozone treatment, the halogen can be originally introduced as bromide or iodide, and thus never need be handled in a hazardous or inconvenient form. In accordance with the invention, the effect of the ozone treatment is to convert the halide to active halogen, of rapid and persistent sterilizing character; in the complete series of operations, the ozone not only reacts with the original halide salt to yield the free halogen, viz. bromine or iodine, but is similarly effective on the halide that is thereafter produced by reaction of the halogen with contaminations in the water, the continuing supply of ozone thus re-converting such halide, at least in substantial part, back to the free halogen.

In this fashion, the ozone treatment serves to maintain the desired halogen residual; yet even in the form of the innocuous, soluble salt, the bromine or iodine need only be added at very infrequent intervals, e. g. to make up losses occasioned by loss of swimming pool water and the consequent daily or other infrequent replacement of such water, or to make up for progressive but essentially slow losses occasioned as some portions of the halogen are permanently converted to other, non-sterilizing forms.

A particular advantage of the process is that it obviates the continuous use and preferably all use, of any type of free halogen whatever, e. g. chlorine, bromine or iodine. Chlorine itself is in some senses a hazardous material, particularly in compressed form as commonly supplied (in tanks or cylinders under high pressure); even in small quantities it is corrosive to piping and other equipment, while a leak of a larger amount can be dangerous to personnel. It is thus often desirable to avoid any necessity for having it on hand, or for dealing with it, especially in urban areas and notably in public buildings, such as schools, Y. M. C. A. buildings and the like, where it is essential to provide the utmost safety for all persons concerned.

Ozone, as employed in the present process, is a relatively innocuous substance, easily produced in a controlled quantity at the locality of use and accompanied by no hazards such as toxicity, or corrosiveness toward metal articles or equipment. A further and notable result of the process is that it also, and inherently, takes advantage of certain important purifying characteristics of ozone itself. While this substance, although a powerful sterilizing agent, cannot be used alone for that purpose because its extremely low solubility in water prohibits the maintenance of any residual action for more than a very few minutes after treatment, it is nevertheless a powerful oxidizing and bleaching agent having effective action in removing objectionable color, tastes and odors from water, and is indeed superior in these respects to the free halogens. In consequence the continuous treatment of recirculated or other water with ozone in accordance with the present invention not only produces the desired halogen residual in the manner explained above, but also enhances the purification of the water in other respects, by removing undesired taste, odor and color, which in the case of swimming pools may often tend to build up, in the course of time, even though the water is kept relatively sterile with respect to pathogenic organisms.

For treatment of a swimming pool, or like large body of water which is maintained relatively intact and which may undergo more or less continuous re-contamination, the process is initiated by introducing a suitable amount of the halide of a halogen of greater atomic weight than chlorine, i. e. a bromide or iodide, and treating the water with ozone for the desired reaction to establish a residual of the free halogen. For instance, during a preliminary period of little or no use of the pool, successive portions of the water may be re-circulated past the treatment zone, where the halide and ozone are continuously introduced; or such treatment may be applied to the water as it is originally brought in to fill the pool. Thereafter as the pool is used, successive portions of the water, usually a small part of the entire body, are re-circulated past the treatment locality, where further ozone is supplied and serves a continuing, purifying purpose, viz. both in the additional manner described above and most significantly in re-converting to active haligen, the bromide or iodide content arising from reaction of the previously established active agent in removing organic contamination. Such further treatment may be continued for most of the time that the body of water, i. e. the swimming pool, is in use and may indeed be made continuous, although during periods when the degree of contamination is relatively slight, the free halogen content can be built up to a desired value and the ozone treatment interrupted until it is again needed for restoration of active bromine or iodine.

Ordinarily, further quantities of bromine or iodine, e. g. in the form of an alkali metal salt, need only be added about once a day or at other infrequent intervals, i. e. to take care of actual replacements of water in the pool and to compensate for chemical loss such as explained below. The hazards, difficulties and expense of a continuous feed of elemental chlorine, bromine or iodine are entirely avoided, and likewise the physiologically undesirable effects of buiding up a substantial concentration of bromide or iodide in the water, such as may arise when bromine or iodine is continuously used by itself. While the infrequently needed increments of halogen in the present process may be effected with the elemental substance, i. e. by actual supply of bromine or iodine per se, and while the peculiar advantages of the re-circulating treatment with ozone for continuing purification and maintenance of free halogen residual over long periods can then still be realized, it is greatly preferred, both for economy and greatest convenience, to use the harmless, soluble halide salts as described above. Whereas any suitably soluble halide of the stated class of halogens may be employed, the sodium and potassium salts have been found convenient and relatively inexpensive.

By the complete procedure set forth, a satisfactory content of sterilizing agent is maintained in the body of water at all times, i. e. by the relatively continuous operation, at least to the extent necessary, of the stated ozone treatment on the re-circulated stream, which itself may be only a relatively small portion of the entire body. For example in the case of swimming pools having a volume of say 100,000 to 1,000,000 gallons of water, the rate and volume of flow in the re-circulated stream may be no more than such as to provide a complete turn-over, so to speak, about every 8 hours.

Operations of the character herein described may also be employed for the single treatment of water or other aqueous liquid, for example in a supply main where the liquid simply flows once past the treatment path and is not returned. Although some of the advantages mentioned herein may not then be realized, the operation is of value under special conditions, e. g. where it may be essential to avoid the hazard or difficulty of using any free halogen at all, i. e. free chlorine, bromine or iodine. For example, a continuous, very small stream of sodium bromide solution may be fed to the passing water and the latter then ozonized to yield free bromine, which will persist as a residual of disinfecting agent; or similar operation may be obtained with iodide.

In all cases, the ozone can be conveniently supplied by a suitable ozone generator, of which effective types are known and available. Such generators, usually employ the so-called silent electric discharge between two conducting surfaces separated by a dielectric, the space between such surfaces being occupied partly by air (or oxygen) introduced as the source of oxygen for conversion to ozone, and partly by one or more layers of solid dielectric. For instance, the conducting surfaces may be metallic foils in good contact with the outer faces of glass layers between which the air is passed. Upon applying an alternating E. M. F. of suitable high value, say 10,000 volts, across the conductors, a small alternating current flows, due to the silent discharge (usually seen as a purplish glow), and the continuously withdrawn air (or oxygen) is found to contain a useful concentration of ozone. As an instance of the considerable literature on ozone production, reference may be made to: F. E. Hartman, "Recent progress in the production of ozone," Transactions of the American Electrochemical Society, vol. 44, pages 227 to 243 (1923).

In utilizing ozone as produced by such a generator, the effluent gas from the latter is appropriately bubbled through the water which is to be treated in accordance with the present process. For example, the water may be conducted through an upright length of pipe or the like which constitutes an ozone absorbing tower wherein the ozone-containing gas is injected at the bottom, due provision being made for withdrawal of excess gas (i. e. the diluent air) at the top without interrupting the desired flow of water.

In general, and under the presently preferred conditions where relatively small concentrations of the reactants are employed in the aqueous liquid under treatment, the probable reaction between the ozone and the selected halide is believed to be represented by the following equation, wherein the symbol X indicates a halogen of atomic weight greater than chlorine (i. e., bromine or iodine):

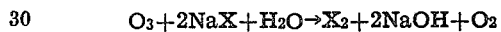
$$O_3 + 2NaX + H_2O \rightarrow X_2 + 2NaOH + O_2$$

Thus theoretically each P. P. M. of ozone liberates 3.33 P. P. M. of bromine or 5.29 P. P. M. of iodine. Whether this precise reaction or some other reaction or set of reactions may actually occur is difficult to determine, but extensive tests have demonstrated that the ozone in fact functions to liberate free bromine or iodine from the corresponding salt, i. e. from the halide form, under the described circumstances and even where not more than a few P. P. M. of each reactant is present.

More specifically, tests have indicated that when a bromide is used, 20% to 70% of the ozone may react to release free bromine, the precise proportion depending on bromide concentration, degree of contamination, if any, in the aqueous liquid, and like factors. Under such circumstances, there is practically always a considerable part of the ozone left in the water for a short interval, to exert its bleaching and deodorizing action, as well as to contribute by itself, for a brief initial time, a rapid and powerful sterilizing effect.

When an iodide is employed, it appears that about 15% to 20% of the ozone reacts to release free iodine, e. g. when the concentrations of these substances in the water are of the extremely small order indicated above; this proportion of the ozone nevertheless represents effective use of such material, for the present process, i. e. to produce or maintain a content of active halogen. It also appears that between 30% and 70% of the ozone may react to produce iodate from some of the iodide, while from 15% to 50% of the ozone may remain unreacted, and although dissipated within a few minutes, may serve the supplemental and desirable functions explained above. The exact proportions of the ozone consumed or remaining in these ways, appear to depend on the particular conditions, e. g. of iodide concentration, concentration of ozone, amount of ozonized air applied, temperature, contact time between air and water, and like factors.

A further factor influencing the effectiveness of reaction between ozone and halide under certain circumstances is the pH of the water or other aqueous liquid under treatment. More particularly, for satisfactory results in release of either halogen in available form, it is preferred that the pH of the liquid be not much over about 9; distinctly superior results with the process usually require pH 8 or lower. While supplemental treatment or reagents can be employed to reduce the pH in cases where it is too high (i. e. where the alkalinity of the liquid is excessive), most swimming pool waters and likewise ordinary water supply systems for personal use are ordinarily below the higher limit stated above.

According to extensive tests, no bromate appears to be formed in the course of treatment of the bromide with ozone (at least at the extreme dilutions here contemplated), so that the use of bromine or bromide is in consequence somewhat preferred in the present process, e. g. there being then more efficient utilization of ozone. Where iodide is employed the proportion converted to iodate represents a minor loss of iodine atoms (as well as of ozone); the iodate is of no value, and its formation makes it necessary to replace the iodide at somewhat more frequent intervals than is the case with bromide. Nevertheless the process is perfectly usable with iodide or iodine, and indeed may be of special desirability under some circumstances.

The following are certain specific examples of the process, i. e. illustrating the manner in which continuous conversion of halide to active halogen may be achieved under circumstances precisely representing those found in the treatment of swimming pool water, or in industrial systems involving large, re-circulated bodies of aqueous liquid, or the like.

*Example I*

For introduction of ozone, the water under treatment was passed through an ozone absorber constituted by a glass pipe, 5 centimeters in diameter and 5 meters high. The stream of aqueous liquid to be continuously treated, i. e. water, was introduced at the top of the absorber at the rate of 3900 cc. (cubic centimeters) per minute and was withdrawn from the bottom through a suitable constriction at such rate that the absorber was practically full of water at all times. Prior to its entrance into the absorber, the flowing water was continuously treated with sodium bromide, i. e. a dilute solution of such salt in amount sufficient to introduce 20 P. P. M. of sodium bromide in the water. At the bottom of the tower there were introduced 180 cc. per minute of air containing 35 to 40 mg. (milligrams) per liter of ozone. In effect, this represented a supply dose of 1.75 P. P. M. ozone in the passing water. It was found that from the supplied dose, 1.50 P. P. M. ozone was absorbed, the remainder passing off with the excess gases at the top of the absorber. The effluent water, i. e. from the bottom of the tower, was found to contain 2.9 P. P. M. free bromine, i. e. bromine in active, sterlizing form. The water also contained between 0.6 and 0.7 P. P. M. ozone which was dissipated within a few minutes. The bromine, in the stated concentration, remained as an effective residual and thus persistently available for sterilizing action, exactly as if it had been introduced in elemental state.

*Example II*

Employing the same apparatus and the same general method of operation as in Example I, water to be treated was introduced into the top of the ozone absorber at the rate of 3800 cc. per minute, after having been preliminarily treated with 3.9 P. P. M. potassium iodide, for example by continuous feed of iodide solution to the flowing water. At the bottom of the absorber, air containing 10 mg. per liter of ozone was introduced at the rate of 150 cc. per minute, constituting a dose of 0.4 P. P. M. ozone submitted to the water, i. e. as contained in the air which bubbled up through the absorber. Of the supplied gas, 0.33 P. P. M. ozone was found to be absorbed in the water, the balance escaping with the air at the top of the tower. The effluent water from the tower was found to contain 0.25 P. P. M. free iodine, viz. in active, available form. In consequence ozone in the amount of 0.28 P. P. M., i. e. relative to the water, was not used for the desired reaction, some of this excess ozone reacting with a portion of the iodide to form iodate, and the remainder of the ozone existing for a short while in the water, as a supplemental purifying and sterilizing agent.

*Example III*

Again using similar apparatus and type of operation, the water to be treated was introduced at the top of the ozone absorber at the rate of 2000 cc. per minute, after treatment with 32 P. P. M. potassium iodide. The air introduced at the bottom of the absorber, to bubble upward through the latter, at the rate of 300 cc. per minute, contained ozone in the amount of 28 mg. per liter. From the thus supplied dose of 4.2 P. P. M. ozone, 2.8 P. P. M. was absorbed in the water, the remainder leaving with the air at the upper end of the absorber. The aqueous effluent from the tower was found to contain 2.9 P. P. M. free iodine, thus resulting from the reaction between ozone and iodide, the water also containing iodate ion in amount of 1.1 P. P. M. Ozone in quantity of 1.35 P. P. M. remained unreacted (with iodide) in the water for a brief interval after the treatment.

It will be seen that the procedure is convenient and effective, to convert bromide or iodide into the corresponding halogen in active or available form, under continuous operation and at a variety of concentrations of the reactants. The effectiveness of the noted concentrations of free bromine or free iodine, i. e. in sterilizing power in swimming pool water and other conditions, has been abundantly demonstrated by a variety of tests. Generally speaking, the concentration of free halogen to be maintained in the water may vary from about 1 P. P. M. upward, amounts greater than about 20 P. P. M. being ordinarily unnecessary in a wide variety of usual types of water treatment. Frequently, considerably smaller amounts of free bromine or free iodine (for instance, as in Example II above) may be effectively employed for disinfecting purposes; a practical minimum is about 0.1 P. P. M. of either element in free form, although it is normally desirable to maintain a residual of at least about 0.2 to 0.3 P. P. M. in the water, and more preferably to operate the treatment so that on the average at least about 0.5 P. P. M. active (free) bromine or iodine is maintained, thus affording leeway for any sudden and unexpected increase in the load of contamination, which may require prompt removal before an increase in the treatment rate can be rendered effective in the body of pool water.

In the case of both of the halogens of the stated class the yield in active form depends on the dosage (meaning here, the actually absorbed dosage) of ozone and the quantity of iodide or bromide (now considered as halide ion rather than as the complete salt) which may be present in the water, it being remembered that such halide may exist as the originally introduced salt or as the halide resulting from reaction of the corresponding active halogen with contaminating organic material, e. g. bacteria, to remove the latter. In view of the dependence of the yield of active halogen on variable factors as just indicated, minimum quantities of the reactants to be maintained under any given set of conditions will correspondingly vary. Introduced preferably as halide, and thereafter present as either halide or free halogen (more usually, some of each), it may be noted that very approximately, the atoms of the selected halogen should ordinarily be present in an amount of at least about 0.2 P. P. M. For assured results under conditions that may vary considerably, the total halogen content (in both combined and free form) should be not less than about 1 P. P. M. and preferably at least several P. P. M.

As will now be apparent, the ozone dose in the recirculated or other passing stream may vary from a fraction of a P. P. M. up to several P. P. M., under ordinary conditions, the quantity being chosen to liberate the desired amount of halogen for production or maintenance of intended, sterilizing effect. Thus, speaking very approximately, for swimming pool or other water treatment of an ordinary sort, the absorbed ozone dose may vary from a fraction of a P. P. M., say even as low as 0.1 P. P. M., but more usually at least about 0.3 P. P. M., up to 2 or 3 P. P. M.

It will now be appreciated that the procedures of the invention afford marked improvement in disinfecting operations, especially in the case of swimming pools and like re-circulated systems where repeated contamination may occur and where it is desirable to avoid the hazard, inconvenience or expense of utilizing any free halogen, or at least of utilizing any such halogen in a continuous manner. The present process of continuously or at least frequently treating the re-circulating minor flow of water from such pool or other body to raise the iodine or bromine content to a desired, though small residual value, is effective to maintain a suitable residual value correspondingly throughout the pool, these halogens being, in their active form, effectively persistent, in promptly reaching all parts of the pool. It will be understood that under preferred schemes of control, the main body of water in the pool is never allowed to drop, in residual halogen content, below a selected minimum, the continuing treatment of the minor flow being effective in a progressive manner to bring the pool water up to an optimum residual value, and indeed, on the average to keep it at such value. During at least a greater part of the operation, the aqueous liquid subjected to ozone treatment will contain some active halogen and a substantial content of the halide, it being ordinarily preferable, particularly so in the case of iodine, to maintain a substantial excess of halide, over the amount from which the selected dosage of ozone actually produces the free bromine or iodine.

As will also be apparent, the procedure is easy to control, and may be used with complete safety, both in respect of any hazards toward operating personnel and in respect to physiological safety of the treated water. As indicated above, the process likewise has utility in continuous, single treatment of flowing aqueous liquid, e. g. in water supply systems, where it is desired to avoid previous types of treatment for reasons such as above explained.

Experience has also revealed that the ozone is not impeded, in its described reaction, by ammonia type materials which may be present in the water under treatment and which, as indicated above, do not essentially impede the effectiveness of the halogens of greater atomic weight than chlorine, for destruction of organisms such as pathogenic bacteria.

It will be appreciated that reference to the removal or destruction of contaminating material in aqueous liquids, includes and indeed usually means the elimination of the contaminating or otherwise objectionable character of such material by chemical reaction rather than by any mechanical separation of the material from the liquid.

It is to be understood that the invention is not limited to the specific procedures herein described but may be carried out in other ways without departure from its spirit.

We claim:

1. Procedure for treating aqueous liquid which may have a contaminating organic content, to provide a prolonged sterilizing effect in said liquid, comprising establishing in the liquid a content of a halogen of greater atomic weight than chlorine, in available form to provide an appreciable sterilizing effect, a part of said halogen being then reduced to halide by organic content of the liquid, and continuing sterilizing action in the liquid and re-establishing said content of said available halogen for further sterilizing effect, by introducing ozone in the liquid in amount sufficient to convert at least an appreciable part of the aforesaid halide into available halogen, said first-mentioned step of establishing a halogen content including supplying halogen material in amount to add at least about 0.2 P. P. M. of said halogen to the liquid, and said procedure of establishing a halogen content and treating with ozone providing not more than about 100 P. P. M. residual content of said halogen in available form in the liquid.

2. Procedure for purifying a body of aqueous liquid which is circumstanced to receive successive organic contaminations over a prolonged period of time, comprising establishing in said liquid a content of a halogen of greater atomic weight than chlorine, in available form to be active in removing such contaminations, said halogen being thereby reduced to halide form; and throughout said prolonged period, treating the liquid by introducing, at least into successive portions of said body, successive quantities of ozone, for reaction with the halide, whereby a content of said first-mentioned halogen in available form, of not more than about 100 P. P. M., is substantially continuously maintained in said body of liquid throughout said period, said first-mentioned step of establishing a halogen content including supplying halogen material in amount to add at least about 0.2 P. P. M. of said halogen to the liquid.

3. Procedure for purifying a body of aqueous liquid which is adapted to contain contaminating organisms and to receive further contaminating organisms from time to time over a prolonged period, and which is also adapted to have portions of its liquid removed from time to time and replaced by fresh liquid, comprising supplying to said body a quantity of a halogen, in halide form, of greater atomic weight than chlorine, supplying ozone to the liquid for reaction with at least a part of said halide to convert the same to the corresponding halogen in available form, said available halogen being active to remove contaminating organisms and being thereby reduced to halide form, and supplying successive further amounts of ozone for reconversion of the said halide, at least in substantial part, to the available form, substantially as necessary, and supplying successive further quantities of the aforesaid halide to replace losses due to removal and replacement of the aqueous liquid, said successive supply steps being cooperatively controlled to maintain an effective residual content of the aforesaid available halogen, greater than 0.1 P. P. M. and not more than about 100 P. P. M., in the aqueous liquid throughout the aforesaid period.

4. Procedure for treatment of aqueous liquid to remove contaminating material, comprising supplying to the liquid a quantity of a halogen, in the form of a halide, which is of greater atomic weight than chlorine and which in its available state is adapted to react with said contaminating material to remove the same, and producing from said halide a desired concentration, of not more than about 100 P. P. M., of the corresponding available halogen by supplying ozone in the liquid, in amount sufficient to react with at least an appreciable part of said halide to convert it to said available halogen in amount of at least about 0.2 P. P. M. in the liquid.

5. Procedure for purifying treatment of a swimming pool, comprising establishing and maintaining in the water thereof, a content of atoms of a halogen of greater atomic weight than chlorine, in an amount of at least about 0.2 P. P. M., at least a substantial part of said halogen being established in available form, and regularly introducing ozone into portions of said water to maintain at least a substantial proportion of said halogen in available form by reaction of said ozone with halide formed by reaction of available halogen with contaminating material, said procedure of establishing a halogen content and treating with ozone providing not more than about 100 P. P. M. residual content of said halogen in available form in the liquid.

6. The procedure of claim 5 in which the step of establishing said halogen content in the water with at least a substantial part thereof in available form comprises supplying the halogen to the water in the form of a soluble halide and introducing ozone in said halide-containing water for reaction with at least a substantial part of the halide to convert the same to the available halogen.

7. Procedure for purifying treatment of a body of aqueous liquid, comprising establishing and maintaining in the liquid a content of atoms of a halogen of greater atomic weight than chlorine, in amount of at least about 1 P. P. M., at least part of said halogen being first established in available form and part of said halogen at least becoming established in halide form, at least in part by reaction of the available halogen with contaminating material in the liquid, and introducing into successive portions of said liquid, successive quantities of ozone, in sufficient amounts and at sufficiently frequent times to maintain a content of the halogen atoms, in free available form, of at least about 0.2 P. P. M., and not more than about 100 P. P. M. in the liquid, by reaction of said ozone with said halogen in halide form.

8. The procedure described in claim 7 wherein the halogen is iodine and wherein the step of establishing the content of iodine atoms in the liquid comprises introducing soluble iodide into said liquid in amount sufficient to provide at least about 2 P. P. M. of iodine atoms, and introducing ozone into the iodide-containing liquid to provide the first establishment of at least part of the iodine in available form by reaction of the ozone with at least part of the iodide.

9. The procedure described in claim 7 wherein the halogen is bromine and wherein the step of establishing the content of bromine atoms comprises introducing soluble bromide into said liquid, and introducing ozone into the bromide-containing liquid to provide the first establishment of at least part of the bromine in available form by reaction of the ozone with at least part of the bromide.

10. Procedure for purifying aqueous liquid, comprising introducing into said liquid 0.2 to about 20 P. P. M. of a halogen of greater atomic weight than chlorine, in the form of halide, and thereafter treating the liquid with ozone to convert at least a part of said halide to free halogen, to establish a residual free halogen content of at least 0.1 P. P. M.

11. Procedure for purifying a passing flow of aqueous liquid, comprising feeding successive quantities of soluble bromide into the same to introduce in the liquid a content of bromine atoms of 0.2 to 100 P. P. M., and introducing successive quantities of ozone into the bromide-containing flow of liquid, to convert at least part of said bromide to free bromine, for purifying effect of the latter in the liquid.

12. Procedure for purifying a passing flow of aqueous liquid, comprising feeding successive quantities of soluble iodide into the same to introduce in the liquid a content of iodine atoms of 0.2 to 100 P. P. M., and introducing successive quantities of ozone into the iodide-containing flow of liquid, to convert at least part of said iodide to free iodine, for purifying effect of the latter in the liquid.

13. Procedure as described in claim 2 in which the step of establishing said first-mentioned content of halogen in available form comprises feeding such halogen in soluble halide form into said liquid, said soluble halid being supplied in an amount to introduce between 1.0 P. P. M. and 100 P. P. M. of the halogen atoms in the liquid, and introducing ozone into the liquid for reaction with said supplied halide to release available halogen therefrom.

HENRY C. MARKS.
FREDE BERNHARDT STRANDSKOV.

REFERENCES CITED

The following references are of record in the file of this patent:

UNITED STATES PATENTS

| Number | Name | Date |
|---|---|---|
| 1,197,640 | Kriegsheim | Sept. 12, 1916 |
| 1,563,850 | Hartman | Dec. 1, 1925 |
| 2,443,429 | Marks et al. | June 15, 1948 |

OTHER REFERENCES

Treatise on Chemistry, by Roscoe et al., vol. 1, 1920, page 269.